Aug. 19, 1930.   A. HOPKINSON   1,773,621
BELT CONVEYER
Filed Oct. 6, 1928

Inventor
Austin Hopkinson
By
Attorney

Patented Aug. 19, 1930

1,773,621

UNITED STATES PATENT OFFICE

AUSTIN HOPKINSON, OF AUDENSHAW, ENGLAND

BELT CONVEYER

Application filed October 6, 1928, Serial No. 310,839, and in Great Britain February 9, 1928.

It has been found that considerable trouble is experienced with belt conveyers (particularly with those of the portable type) owing to material falling upon the return or idle side of the belt and getting between it and the rollers. This invention is intended to obviate this difficulty.

A troughed belt, or a belt so made that it tends to trough itself, is preferably used and, instead of following the usual practice of running the return belt flat, the return belt is supported by cylindrical rollers which permit the belt to assume or retain its trough form but inverted, so that the idle belt presents a sloping surface to any material which falls upon it, and this without involving different relative speeds between belt and supporting rollers, as is the case when the return belt is supported upon cambered rollers. The supporting rollers for the return belt may be similar to those commonly used for the belt on its conveying or outward journey, which are usually designed to provide a troughed or concave support for the belt, but in the case of the return belt these rollers would be inverted so that the belt would assume or retain an inverted trough formation.

The invention is illustrated in the accompanying drawings as applied to a belt conveyer of the portable type in which the roller frames are held in position by applying tension to flexible ropes passing through clamping devices carried by the frames, but it will be understood that the invention is not restricted to this known type of portable conveyer.

Figure 1:
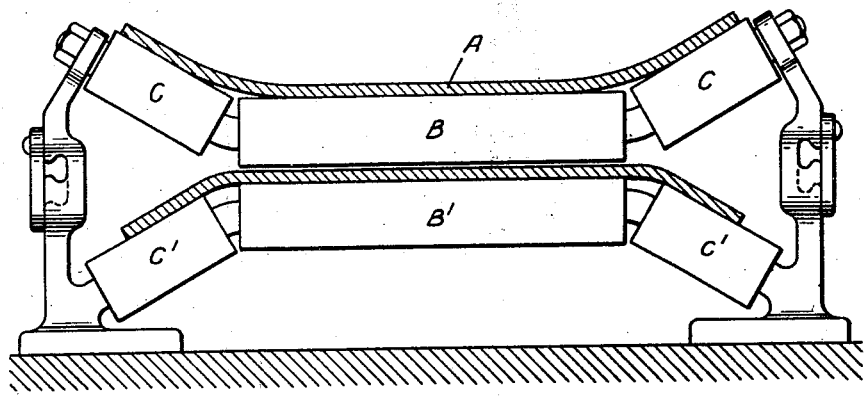
Figure 2:
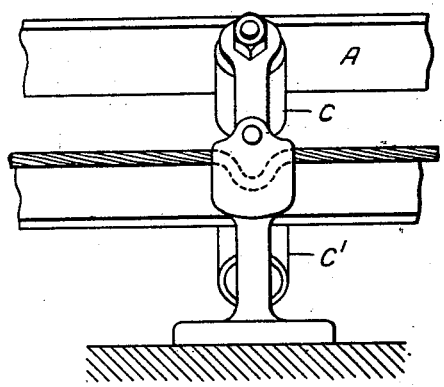

Fig. 1 shows a cross section of such a conveyer and Fig. 2 a side elevation of one of the frames and adjacent parts.

In these drawings A represents the conveyer belt which may be troughed in its manufacture or so made as to tend to assume a trough shape, and which is shown as supported on the outward or conveyer journey by means of rollers B, C, C so disposed as to afford adequate support for the middle part and the edges of the belt and maintain its trough formation. The support for the idle or return journey of the belt is afforded by similar rollers B', C', C', but the two latter rollers are inclined in a downward direction instead of an upward direction, so that the edges of the belt will rest upon them with a downward inclination towards the outside. The idle belt will thus present a sloping surface at either side to any material which falls upon it, and such material will consequently slide off the belt and will not lodge between it and the rollers.

It is possible to dispense with the side rollers C', C' and use only the central roller B' on the return journey of the belt as the edges of the latter, whether originally made with a permanent troughed section, or whether merely of a character which tends to assume such a troughed section, will naturally be inclined downwardly towards the outside so as to shed any material which may fall upon them.

While the invention is primarily designed for belt conveyers in which the belt is trough-shaped on its loaded side, it is also applicable to cases in which the belt is supported so as to lie flat on its loaded side. In either case, the rollers supporting it on its idle side will, as hereinbefore described, consist of a series of central rollers such as B' with or without downwardly and outwardly inclined side rollers such as C', C', enabling the idle side of the belt to assume a troughed form so as to shed any material which may fall upon it.

Having thus described the nature of the said invention and the best means I know of carrying the same into practical effect, I claim:—

1. An endless belt conveyer, comprising a belt and rollers rotatable on axes inclined to one another and against which the under faces of marginal portions of the return stretch of said belt bear and by which the return stretch of the belt is supported in inverted trough shape.

2. An endless belt conveyer comprising a belt and means for supporting the return stretch of the belt in inverted trough shape; said means comprising cylindrical rollers rotatable on horizontal axes and engaging the under face of the return stretch of said belt between its edges and cylindrical rollers rotatable on axes inclined downwardly relative to the axes of said first named rollers and engaging the under face of the return stretch of said belt at its opposite marginal portions.

In testimony whereof I have signed my name to this specification.

AUSTIN HOPKINSON.